United States Patent
Yamakawa

(10) Patent No.: US 6,590,742 B2
(45) Date of Patent: Jul. 8, 2003

(54) HEAD CLEANER FOR TAPE DRIVE APPARATUS

(75) Inventor: Kengo Yamakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 79 days.

(21) Appl. No.: 09/818,685

(22) Filed: Mar. 27, 2001

(65) Prior Publication Data

US 2002/0057528 A1 May 16, 2002

(30) Foreign Application Priority Data

Nov. 16, 2000 (JP) ........................................ 2000-349768

(51) Int. Cl.[7] ............................................... G11B 5/127
(52) U.S. Cl. ...................................................... 360/128
(58) Field of Search .................................. 360/128, 137

(56) References Cited

U.S. PATENT DOCUMENTS 5,745,320 A * 4/1998 Ohshima et al. ............ 360/128
6,157,516 A * 12/2000 Hertrich et al. ............. 360/128
6,166,881 A * 12/2000 Anderson et al. ........... 360/128
6,215,618 B1 * 4/2001 Anderson et al. ........... 360/128
6,252,739 B1 * 6/2001 Todd et al. .................. 360/128
6,359,751 B1 * 3/2002 Groel et al. ................. 360/128
6,433,961 B1 * 8/2002 Tsuchiya et al. ............ 360/128

* cited by examiner

*Primary Examiner*—Allen Cao
(74) *Attorney, Agent, or Firm*—Greer, Burns & Crain, Ltd.

(57) ABSTRACT

A tape drive apparatus enables cleaning of a read/write converter head when a tape cartridge is inserted or removed, without interfering with or moving the tape. The tape drive apparatus has a loading mechanism for transferring an inserted tape cartridge to a predetermined position in the apparatus, and a head cleaning unit that can move between a cleaning position in contact with the converter head and a withdrawn position isolated from the converter head. The head cleaning unit moves between the withdrawn position and the cleaning position in synchronization with the transfer operation of the loading mechanism, when there is not tape over the head. In this manner, the head cleaning operation does not interfere with or move the tape.

5 Claims, 5 Drawing Sheets

HEAD CLEANER FOR TAPE DRIVE APPARATUS

The present invention relates to a tape drive apparatus, and more particularly, to a head cleaning mechanism for a tape drive.

BACKGROUND OF THE INVENTION

Japanese Published Unexamined Patent application JP11-296827A2 discloses a typical tape drive apparatus provided with a cleaning mechanism for a read/write converter head. In this related art, the tape drive apparatus has a converter head for reading the data tape of a loaded tape cartridge, and a cleaning device for cleaning the converter head. The cleaning device has a support arm and a rotatable cleaning brush at the end of the arm. When necessary, the converter head can be cleaned by inserting the support arm between the data tape and converter head.

However, this related art has the following problems. First, since the converter head is cleaned when the data tape is in contact with the converter head, the data tape is pushed out away from the head by the cleaning brush. This places excessive tension on the data tape, resulting in a problem from the point of view of data protection.

Moreover, an independent drive source is required to drive the support arm and thereby the cost is increased. In addition, the internal space available for the other mechanisms in the tape drive is reduced to provide installation space for the drive source. Thereby, the entire structure is more complicated and the cost is also increased due to the complication of the structure.

SUMMARY OF THE INVENTION

The present invention has been proposed to eliminate the problems explained above and therefore an object of the present invention is to provide a tape drive apparatus of simplified structure enabling cleaning of the converter head at predetermined times.

In the present invention, a head cleaning unit for cleaning a read/write converter head moves to a withdrawn position from a cleaning position when a loading mechanism is driven toward a loading side (set position side) of a tape cartridge, that is, as a tape cartridge is loaded. The head cleaning unit moves to the cleaning position from the withdrawn position in synchronization with the loading mechanism moving toward the tape cartridge eject side of the loading mechanism, that is, when the tape cartridge is ejected.

The withdrawn position may be set within the apparatus so that it is located at an area away from the running path of the data tape, that is, where interference with the data tape is not generated. Moreover, the moving path of the head cleaning unit may be linear or curved.

With cooperation between the operation of the tape cartridge and operation of the head cleaning unit, automatic cleaning of the converter head can be realized through insertion and removal of the tape cartridge, without any action by a user. Therefore, the converter head can always be maintained in the clean condition, improving reliability of read and write operations. Moreover, since the cleaning operation of the converter head is performed after the loading mechanism has exhausted the tape cartridge, namely when the data tape is not present, the data tape is not damaged.

In known devices the movable part of the loading mechanism, for example, is monitored with a sensor and the head cleaning unit is driven with an adequate actuator in order to synchronize the operation of the head cleaning unit with that of the loading mechanism. With the present invention, it is no longer required to additionally provide such a sensor or actuator for head cleaning purposes, and the structure may be simplified. Manufacturing cost can also be reduced because displacement of the movable part of the loading mechanism can adequately be transferred to the head cleaning unit via the transferring part. In this case, the transfer part is adequate when it can transfer the movement of the movable part of the loading mechanism to the head cleaning part. This can be accomplished by adjusting the moving stroke between the cleaning position and withdrawn position of the head cleaning unit.

BRIEF DESCRIPTION OF THE DRAWINGS

FIG. 3A is a plan view where the head cleaning unit is in the withdrawn position. FIG. 3B is a front elevation view of the head cleaning unit of FIG. 3A and FIG. 3C is a bottom plan view of the head cleaning unit of FIG. 3A.

FIG. 4A is a plan view where the head cleaning unit is located in the cleaning position, FIG. 4B is a front elevation view of the head cleaning unit of FIG. 4A and FIG. 4C is a bottom plan view.

FIG. 5A is a bottom plan view and FIG. 5B is a side view taken along the arrow mark 5B of FIG. 5A.

DESCRIPTION OF THE PREFERRED EMBODIMENTS

Figure 1:
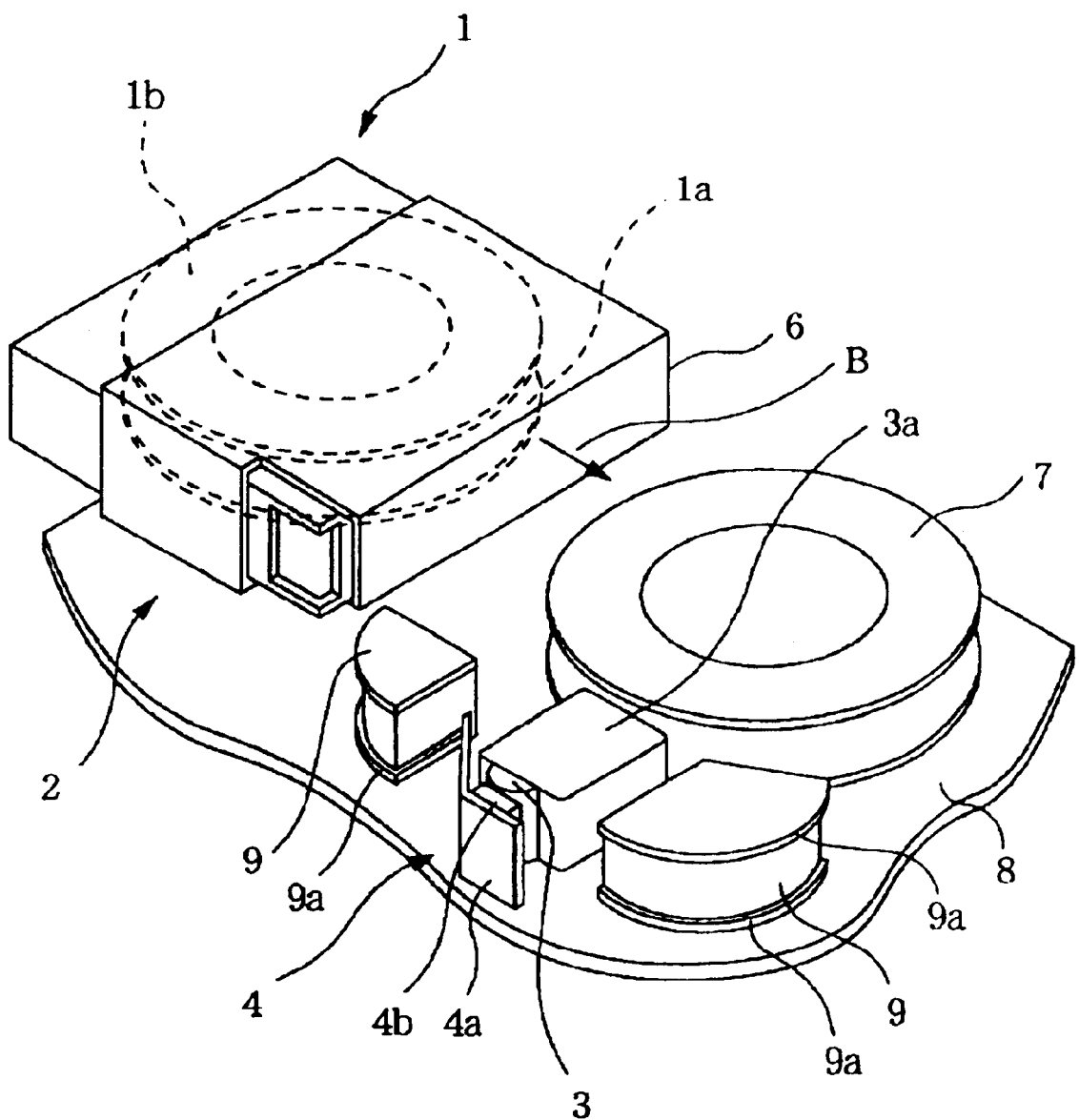
FIG. 1 is a perspective view of a portion of a tape drive apparatus of the present invention.
Figure 2:
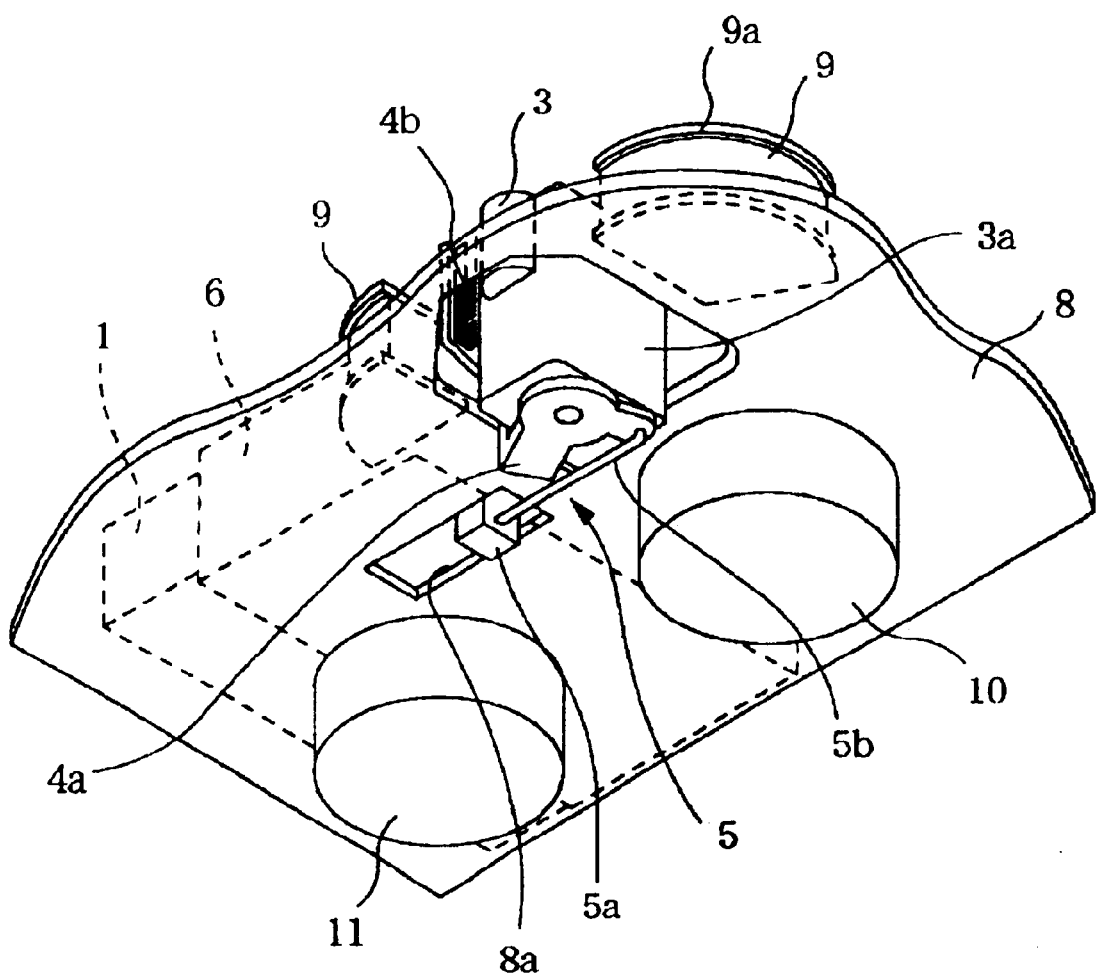
FIG. 2 is a bottom view of the apparatus of FIG. 1.

FIG. 1 and FIG. 2 illustrate a preferred embodiment of the present invention formed as a linear tape drive apparatus using a LTO (Linear Tape Open) medium. The tape drive apparatus has a loading mechanism 2 including a carrier, an apparatus side reel 7, and a converter head 3 that are allocated on a mecha-substrate 8. Tape guides 9 are also allocated on the mecha-substrate of both sides of the converter head 3.

When a tape cartridge 1 is guided by the loading mechanism 2 to a predetermined position within the loading mechanism 2, data tape 1a within the tape cartridge 1 is led out from the tape cartridge 1 with a threading mechanism (not illustrated) and is then wound around the apparatus side reel 7. When the tape is wound around the apparatus side reel 7, the data tape 1a is guided by the tape guides 9 to be in contact with the converter head 3, by maintaining a contact area with the converter head 3 and a contact angle with the converter head 3 to conduct read or write operations with the converter head 3. The tape guides 9 are provided with flanges 9a to regulate deviation in the longitudinal direction of the converter head 3 by guiding the edge of the data tape 1a in the width direction.

In FIG. 2, a motor 10 is provided for driving and rotating side reel 7 in FIG. 1, and a motor 11 rotates the reel 1b of the preset tape cartridge 1.

Figure 5A:
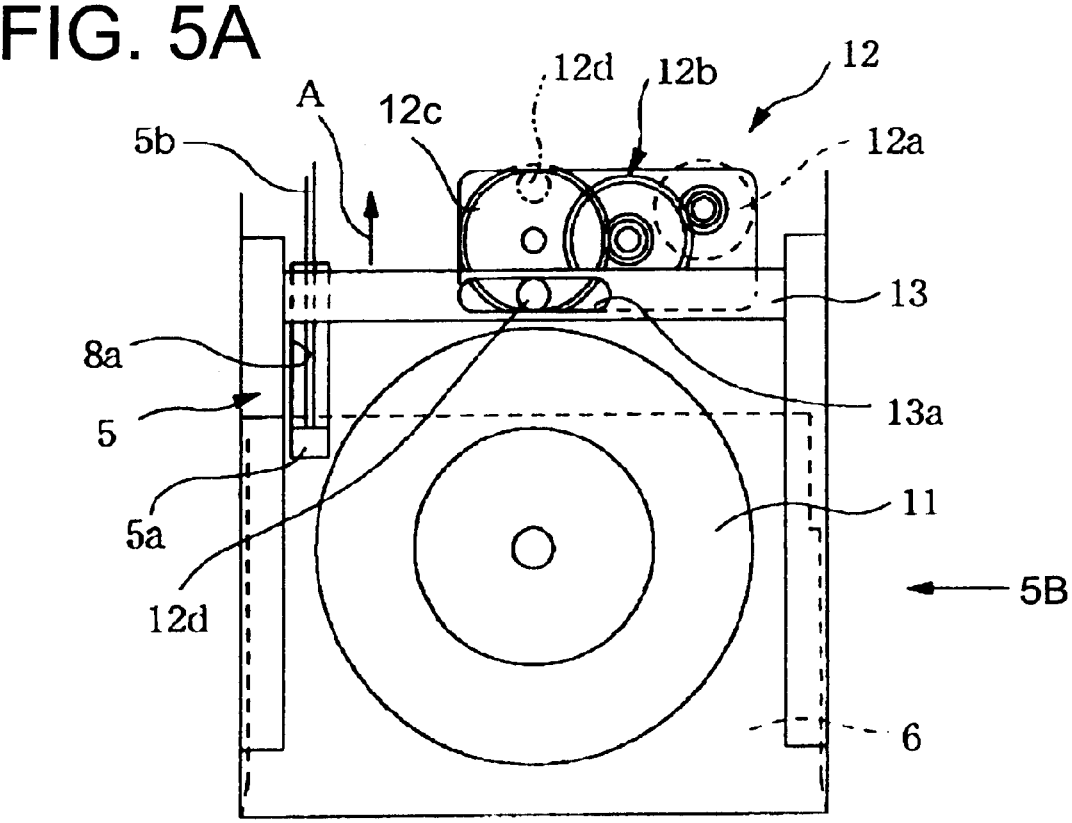
FIGS. 5A and 5B are diagrams illustrating the carrier drive of the tape apparatus of FIG. 1.
Figure 5B:
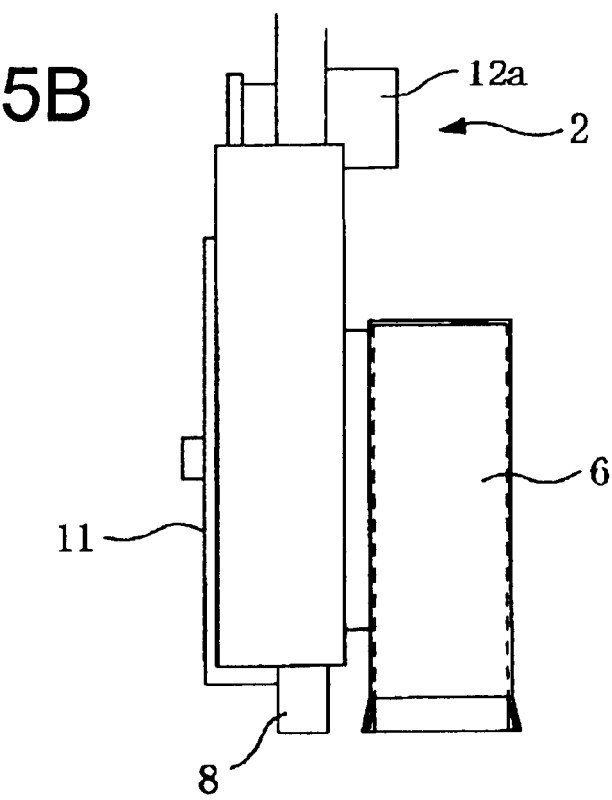

The loading mechanism 2 includes carrier 6 and a carrier drive 12, as seen in FIG. 5A. The carrier drive 12 has a reduction gear train 12b to transfer the force of the drive motor 12a to an end gear 12c. The end gear 12c is provided with a projecting boss 12d. The boss 12d engages with an elongated hole 13a provided in a slide link 13 that is integrally coupled with the carrier 6. When the drive motor 12a operates, the boss 12d moves to the position that is indicated with a chain line from the position indicated with a solid line in FIG. 5A. Thereby, the slide link 13 moves in the direction of the arrow A in FIG. 5a in order to transfer the tape cartridge that is inserted into the carrier 6 to the operating position where the rotating axis of the reel 1b (FIG. 1) is coupled with the rotating axis of the motor 11.

Figure 3A:
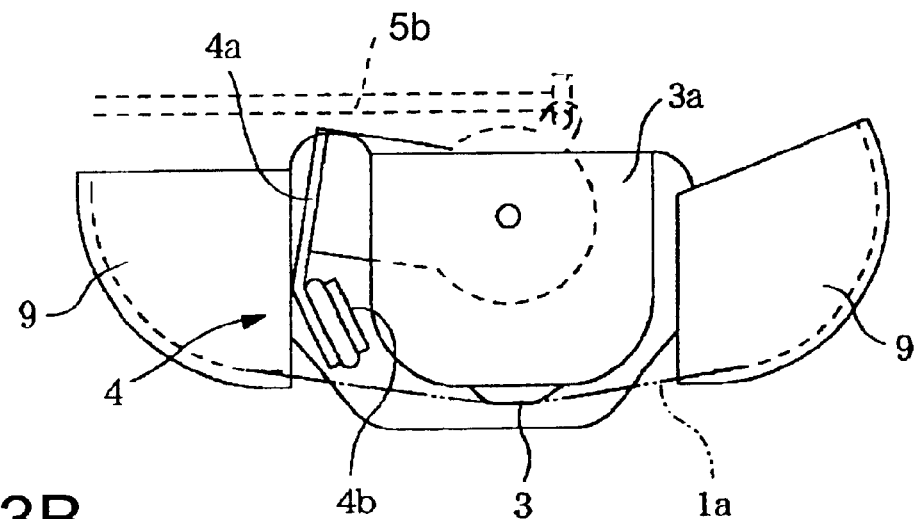
FIGS. 3A, 3B and 3C are diagrams illustrating operation of the present invention.
Figure 3B:
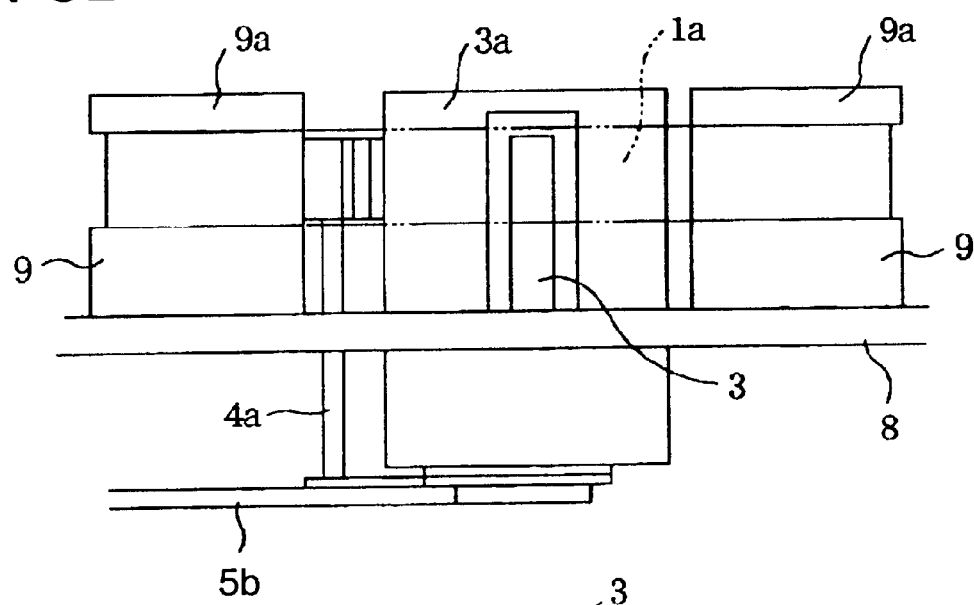
Figure 3C:
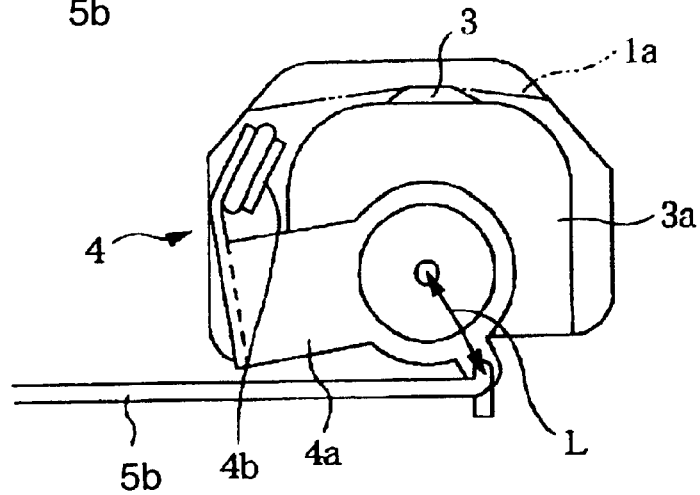

In order to keep the converter head 3 clean, the head cleaning unit 4 has a cleaning brush 4b at the end of an arm 4a located at an area near the converter head 3. The arm 4a is pivotally supported on a head base 3a holding the converter head 3, as illustrated in FIG. 1 and FIG. 3A. Furthermore, the arm 4a can rotate between the cleaning position illustrated in FIGS. 4A, 4B and 4C where the cleaning brush 4b is in contact with the converter head 3, and the withdrawn position illustrated in FIGS. 3A, 3B and 3C, whereby the cleaning brush 4b is withdrawn from the position in contact with the converter head 3, allowing the data tape 1a to pass.

Moreover, in order to drive the head cleaning unit 4, the arm 4a is coupled with the carrier drive 12 via a transfer part 5. In this embodiment, the transfer part 5 is fixed integrally at the rear surface of carrier 6 and is composed of a projected part 5a projected through the rear surface of the mecha-substrate 8 by a rectangular aperture 8a in the mecha-substrate 8, and a coupling rod 5b coupled to the projected part 5a at one end and coupled to rotate with the arm 4a at the other end. Moreover, the distance (arm length L in FIG. 3C) between the rotation center of the arm 4a and the coupling point of the coupling rod 5b is set so that the arm 4a is in the withdrawn position and cleaning position at both end positions of the moving stroke of the carrier 6. In this embodiment, where the coupling rod 5b is fixed to the projected part 5a without any degree of freedom, the coupling rod 5b is formed of a material having some elasticity such as a heavy piano wire material or the like to absorb change of size in the direction orthogonally crossing the moving direction of the carrier 6 when the arm 4a rotates, yet still move the arm 4a in both directions.

Figure 4A:
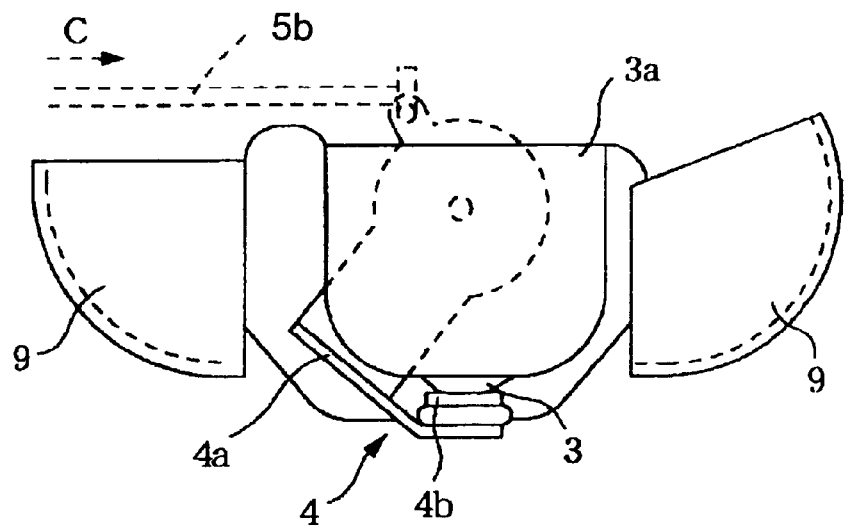
FIGS. 4A, 4B and 4C are diagrams illustrating operation of the present invention.
Figure 4B:
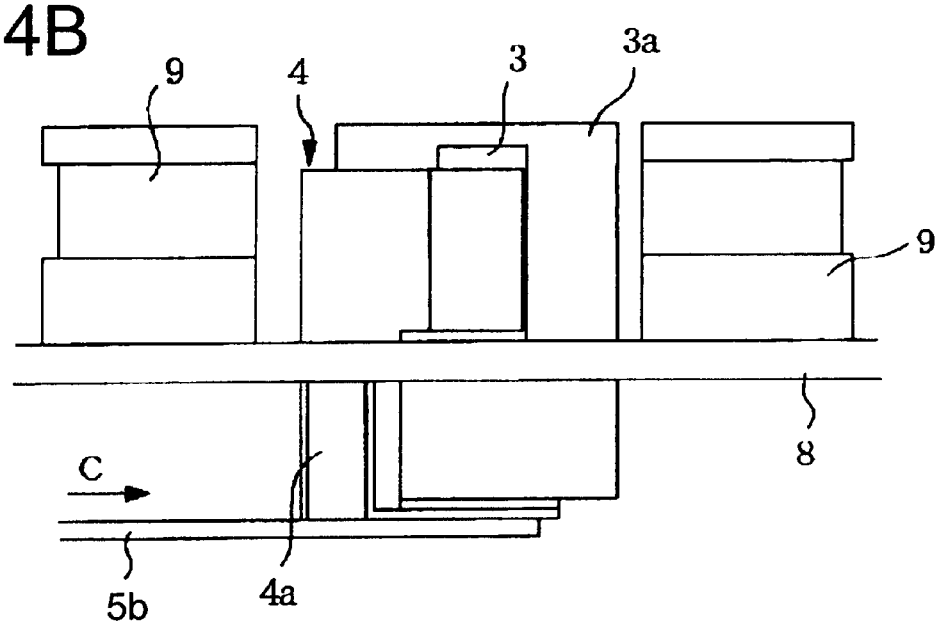
Figure 4C:
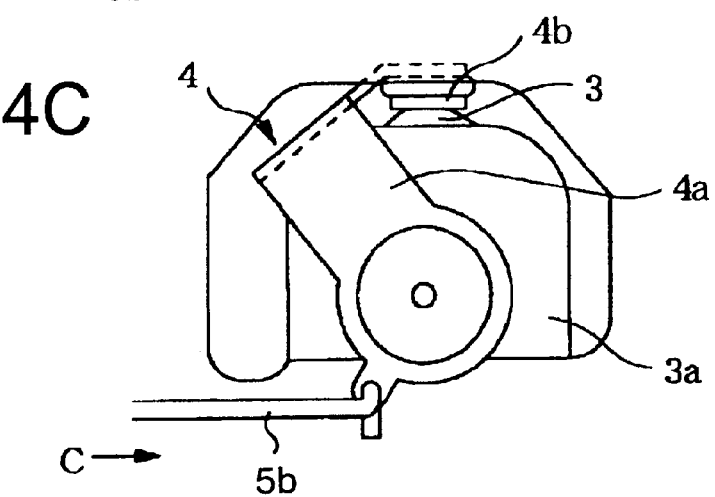

Therefore, in this embodiment, when the tape cartridge 1 is not loaded, the head cleaning unit 4 is located at the cleaning position as illustrated in FIG. 1 and FIG. 4A, and the cleaning brush 4b is in contact with the converter head 3. When a detecting means (not illustrated) detects that the tape cartridge 1 is inserted to the carrier from the condition explained above, the drive motor 12a of the loading mechanism 2 is driven to rotate the end gear 12c for a half-turn to drive the slide link 13. With movement of the slide link 13, the carrier 6 starts to move in the direction of arrow mark B in FIG. 1 to draw the tape cartridge 1 into the apparatus. With movement of the carrier 6, the coupling rod 5b is pushed in the direction of arrow mark C of FIG. 4A in order to rotate the arm 4a. Thereby, as illustrated in FIG. 3, the head cleaning unit 4 moves to the withdrawn position where the cleaning brush 4b is isolated from the converter head 3.

As explained above, when the tape cartridge 1 is loaded, the data tape 1a is pulled out with a threading mechanism (not illustrated) and is then wound around the apparatus side reel 7 for the data read operation. During this period, the head cleaning unit 4 stays in the withdrawn position to prevent interference with the data tape 1a.

When the process of using the tape cartridge 1 is completed, the data tape 1a is re-wound around the reel 1b within the tape cartridge 1 with the threading mechanism, and the loading mechanism 2 is driven towards the exit side of the tape cartridge 1. With operation of the loading mechanism 2, the carrier 6 is returned again to the original position. Therefore, the arm 4a is also pulled toward the coupling rod 5b to rotate counterclockwise in FIG. 3A. Thereby, the cleaning brush 4b moves to the cleaning position in contact with the converter head 3. Thereafter, the converter head 3 can be driven vertically or horizontally to perform the cleaning operation.

As will be apparent from the above explanation, the present invention realizes the cleaning of the converter head with the simplified structure with particular timing.

While the principles of the invention have been described above in connection with specific apparatus and applications, it is to be understood that this description is made only by way of example and not as a limitation on the scope of the invention.

What is claimed is:

1. A tape drive apparatus comprising:
   a loading mechanism for transferring an inserted tape cartridge to a predetermined position within the apparatus, and
   a head cleaning unit connected to a mecha-substrate that moves between a cleaning position to be in contact with a converter head for reading the information from a data tape fed from the tape cartridge, and a withdrawn position isolated from said converter head, in synchronization with the transfer operation of the loading mechanism; and
   a transfer part fixed integrally at a rear surface of a carrier having a projected part projected through an aperture in the mecha-substrate.

2. The tape drive apparatus of claim 1 comprising:
   a transfer unit for transferring displacement of the head cleaning unit by changing said displacement between the cleaning position and the withdrawn position of said head cleaning unit.

3. The tape drive apparatus of claim 2, wherein the head cleaning unit includes a brush at one end of an arm, the arm being pivotally supported so that the head cleaning unit rotates between the cleaning position and the withdrawn position,
   the transfer unit including a coupling rod coupled with the cleaning brush arm to rotate the cleaning brush arm, the coupling rod also being coupled to the loading mechanism so that movement of the loading mechanism causes movement of the head cleaning unit.

4. a tape drive apparatus comprising:
   a loading mechanism for transferring an inserted tape cartridge to the predetermined position within the apparatus;
   a head cleaning unit connected to a mecha-substrate and movable between a cleaning position in contact with a converter head for reading information from data tape fed from the tape cartridge and a withdrawn position isolated from said converter head;
   a transfer unit for transferring displacement of the head cleaning unit by changing said displacement between the cleaning position and the withdrawn position of said head cleaning unit; and
   a transfer part fixed integrally at a rear surface of a carrier having a projected part projected through an aperture in a mecha-substrate.

5. The tape drive apparatus of claim 4, wherein the head cleaning unit includes a brush at one end of an arm, the arm being pivotally supported so that the head cleaning unit rotates between the cleaning position and the withdrawn position, the transfer unit including a coupling rod coupled with the cleaning brush arm to rotate the cleaning brush arm, the coupling rod arm also being coupled to the loading mechanism so that movement of the loading mechanism causes movement of the head cleaning unit.

* * * * *